April 11, 1961 E. R. LAMSON ET AL 2,978,794
METHOD OF LUBRICATING ANTI-FRICTION BEARINGS
WITH BONDED LUBRICANT FILMS
Filed April 16, 1958
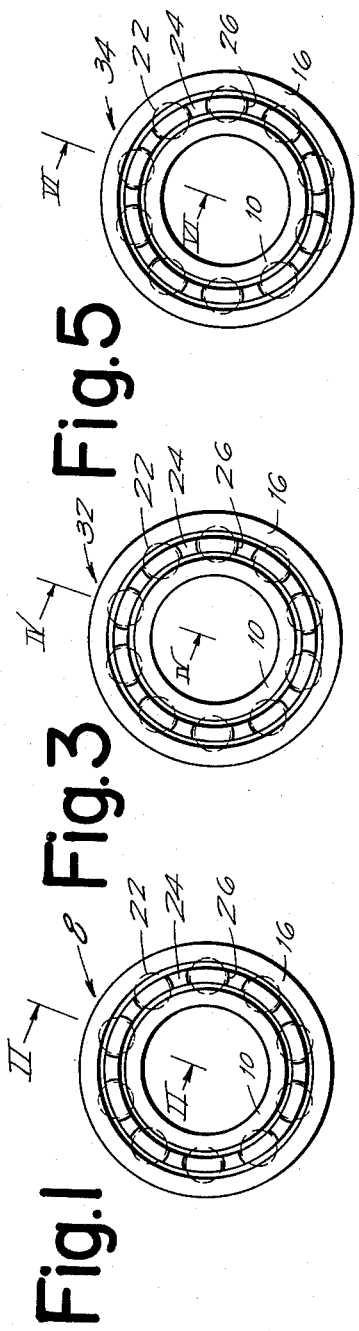
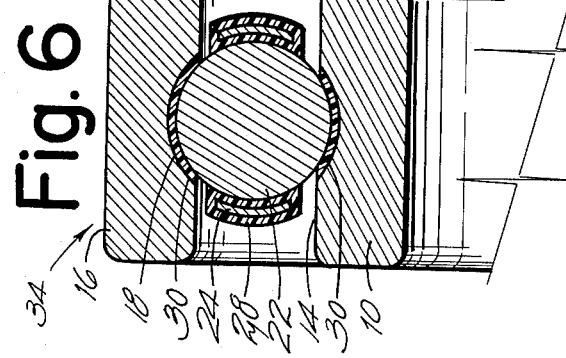
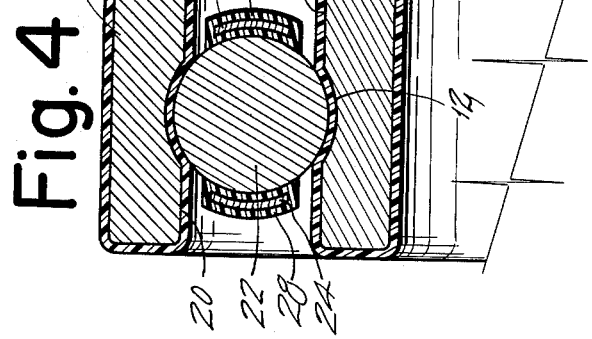
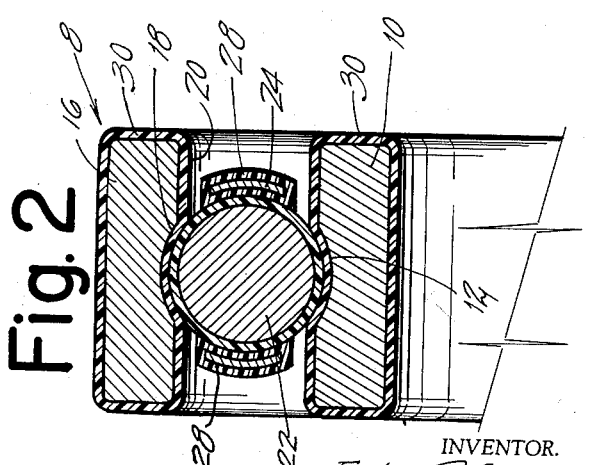
INVENTOR.
EDWARD R. LAMSON
MARTIN J. DEVINE
BY
Arthur L. Collins
ATTORNEYS

United States Patent Office 2,978,794
Patented Apr. 11, 1961

2,978,794
METHOD OF LUBRICATING ANTI-FRICTION BEARINGS WITH BONDED LUBRICANT FILMS

Edward R. Lamson, Box 88, R.D. 4, Greentree Road, Sewell, N.J., and Martin J. Devine, 2560 Prescott Road, Havertown, Pa.

Filed Apr. 16, 1958, Ser. No. 729,042

15 Claims. (Cl. 29—148.4)

(Granted under Title 35, U.S. Code (1952), sec. 266)

The invention described herein may be manufactured and used by or for the Government of the United States of America for governmental purposes without the payment of any royalties thereon or therefor.

The invention relates to anti-friction bearings with bonded film lubrication and to a method of lubricating anti-friction bearings with bonded film lubricants. More particularly, the invention relates to high speed and high temperature anti-friction bearings such as ball bearings having tetrafluoroethylene Teflon (registered trademark) and dry-type lubricants affixed or bonded to the components thereof and to a method of lubricating high speed and high temperature anti-friction bearings by affixing tetrafluoroethylene and dry-type lubricant films to the unassembled components of the bearings.

Prior attempts to lubricate high speed and high temperature anti-friction bearings with both wet-type lubricants such as greases and bonded film lubricants such as bonded Teflon films or bonded films including a dry-type lubricant or lubricants have been universally unsuccessful. It is well known that grease-type lubricants provide excellent lubrication for anti-friction bearings operated under conditions of relatively low speed and low temperatures, but have several inherent disadvantages when the bearings are operated under other conditions. For example, at high temperatures, greases become less viscous and have a tendency to seep or leak from the bearing, this loss due to seepage or leakage eventually and many times very quickly resulting in a failure of the greases to provide a film of lubricant between the friction or coacting surfaces of the bearing components. Conversely, at low temperatures, greases substantially increase in viscosity and materially add to the frictional drag or operating torque of the bearing. When greases are used at high temperature coupled with a high vacuum, the greases vaporize and evaporate and thus deprive the bearing of the needed lubrication. It is also well known that greases deteriorate rapidly when exposed to certain types of chemical attack and nuclear radiation.

Bonded film lubricants, on the other hand, utilizing a Teflon film as a lubricant or utilizing a dry-type lubricant such as a mixture of molybdenum disulphide and graphite as the lubricating constituent of a bonded film, possess none of inherent disadvantages of the wet-type lubricants, but, nevertheless, have never heretofore been successfully employed as a lubricating medium for high speed and high temperature anti-friction bearings such as ball bearings or the like. This failure to successfully lubricate bearings of this type with bonded film lubrication has resulted primarily from the failure to develop a method or technique whereby a bonded film lubricant having a substantially uniform predetermined thickness could be affixed to either all of the components of an anti-friction bearing, selected components of an anti-friction bearing, or selected surfaces of selected components of an anti-friction bearing. A bonded film of substantially uniform thickness is extremely important in the lubrication of high speed and high temperature anti-friction bearings due to the critical tolerances between the friction surfaces of the bearing components. A bonded film which is not substantially uniform in thickness will interfere with the proper relative movement between the components of the bearing and thus produce undesirable frictional forces and heat which will result in a cracking or failure of the bonded film. Bonding or affixing a lubricant to selected components only or to selected surfaces of selected components of an anti-friction bearing is also an important factor in the successful utilization of bonded film lubricants from the standpoint of the use or the environmental application of the bearing. In many environment applications, it has been found desirable and advantageous not to affix a lubricant to all of the components or all of the surfaces of the components of an anti-friction bearing.

Accordingly, one of the objects of the present invention is to lubricate an anti-friction bearing with bonded film lubricants.

Another object of the invention is to lubricate an anti-friction bearing with tetrafluoroethylene.

Another object of the invention is to provide an anti-friction bearing with bonded film lubricants having a substantially uniform and predetermined thickness on the components of the bearing.

Another object of the invention is to provide an anti-friction bearing with bonded film lubricants having a substantially uniform and predetermined thickness on selected components or on selected surfaces of selected components of the bearing.

Another object of the invention is to provide a lubricated anti-friction bearing having a substantially uniform operating torque over the entire operating temperature range of the lubricant.

Another object of the invention is to provide a method of lubricating an anti-friction bearing with bonded film lubricants having a substantially uniform and predetermined thickness.

Another object of the invention is to provide a method of lubricating an anti-friction bearing wherein selected components only of the bearing are lubricated with bonded film lubricants having a substantially uniform and predetermined thickness.

Another object of the invention is to provide a method of lubricating an anti-friction bearing wherein only selected surfaces of selected components of the bearing are lubricated with bonded film lubricants having a substantially uniform and predetermined thickness.

In conformity with these objects, the preferred embodiment of the invention is characterized by a high speed and high temperature ball bearing having a lubricating film of Teflon bonded or affixed to the retainer means thereof and a comminuted dry-type lubricant affixed to the other components thereof by a cured thermosetting bonding agent. The Teflon and dry-type lubricant films have a substantially uniform and predetermined thickness and completely surround or envelope the bearing components to thereby provide a bonded film lubricant on all of the friction surfaces thereof. The preferred method envisioned by the invention for lubricating an anti-friction bearing such as a high speed and high temperature ball bearing includes the steps of coating the cage or retainer means of the bearing in an unassembled state with a water dispersion of Teflon and coating the remainder of the components of the bearing in an unassembled state with a solid comminuted lubricant suspended in a thermosetting bonding agent, heating the coated and unassembled components to thermoset or cure the Teflon and the bonding agent, quenching the coated retainer means to harden the Teflon, and then reassembling the coated components into an operative unit to provide an anti-friction bearing having bonded film lubricants on the friction surfaces thereof. The coatings must, of necessity, be applied in a manner to provide a lubricating film of substantially uniform thickness and the selection of the exact constituents for the coatings will be determined for the most part by the conditions under which the bearing is expected to operate or perform.

These and other objects of the present invention will become readily apparent from the following description taken in connection with the accompanying drawings, wherein:

Figure 1 is a side elevation of a ball bearing illustrating a preferred embodiment of the invention;

Fig. 2 is an enlarged section taken along the line II—II of Fig. 1;

Fig. 3 is a side elevation of a ball bearing illustrating another embodiment of the invention;

Fig. 4 is an enlarged section taken along the line IV—IV of Fig. 3;

Fig. 5 is a side elevation of a ball bearing illustrating another embodiment of the invention; and Fig. 6 is an enlarged section taken along line VI—VI of Fig. 5.

Referring more particularly to the drawings wherein like structural details and components are designated by like reference numerals, Figs. 1 and 2 show an anti-friction bearing 8 of the ball-type having components including an inner ring or race means 10 provided with a circumferentially extending groove or raceway 12 in the outer periphery 14 thereof and an outer ring or race means 16 provided with a circumferentially extending groove or raceway 18 in the inner periphery 20 thereof. A plurality of substantially spherical rolling elements or balls 22, in this instance ten in number, are carried in the raceways 12 and 18 and, due to a predetermined curvature of the raceways 12 and 18, are confined therein for rotary movement in a substantially circular orbit between the inner and outer race means 10 and 16, respectively. Being substantially spherical, balls 22 are also capable of independent rotary movement about their own geometrical axes and thus are capable of rotation both relative to themselves and to the inner and outer race means 10 and 16. A predetermined clearance or tolerance (not shown in the drawings) between the balls 22 and the raceways 12 and 18 permits the balls 22 to roll freely over the surfaces of the raceways.

A retainer or cage means 24 is carried by the balls 22 and serves to space the balls 22 a uniform or equal distance apart in order to equalize any load that may be applied to the balls 22 through the races 10 and 16. The cage means 24 is provided with a plurality, in this instance ten, of pockets or the like 26 therein (Fig. 1) each of which (Fig. 2) is adapted to receive a ball 22. The inner periphery of each pocket 26 is provided with a predetermined curvature and is adapted to be carried on and thus frictionally engage the peripheral surface of its received ball 22.

The components of the anti-friction bearing 8 in this preferred embodiment of the invention are made of steel but may be made of any other material suitable for bearing use such as iron, stainless steel, etc. Various alloys of steel and stainless steel have been found to be particularly satisfactory materials for use in the construction of high speed and high temperature anti-friction bearings. Inasmuch as the structure and function of ball-type anti-friction bearings as well as the materials utilized in the construction thereof are well known in the art and per se form no part of the present invention, further discussion thereof is deemed unnecessary. Suffice it to say that in the use or environment application of the bearing 8, the inner race means 10 is adapted to receive a shaft or the like (not shown) which when rotated will also rotate the inner race means 10 and thereby impart rotation to the balls 22.

As best seen in Fig. 2, the cage means 24 of the bearing 8 carries a lubricant film or coating 28 and the balls 22 and race means 10 and 16 thereof carry a lubricant film or coating 30, the lubricant films 28 and 30 completely surrounding or enveloping each of their respective components and being tightly affixed or bonded thereto. Constituent-wise, lubricant film 28 is comprised of cured tetrafluoroethylene (Teflon) and lubricant film 30 is comprised of a solid comminuted lubricant uniformly dispersed in a cured thermosetting bonding agent. In this preferred embodiment of the invention, bonded film 28 is comprised of a polymerized Teflon One-Coat Enamel, well known commercially as Du Pont 851–204 and basically consisting of a tetrafluoroethylene resin dispersed in a water medium or a water emulsion of Teflon. The emulsified Teflon is applied and bonded to the cage means 24 of the bearing by a method or process which will be more fully discussed hereinafter in connection with the method of lubricating anti-friction bearings with bonded lubricant films. While Teflon in the form of Du Pont 851–204 or a water emulsion of Teflon has been found satisfactory for use in a preferred embodiment of the invention, it will be apparent to those skilled in the art that Teflon in any other suitable form could be utilized in place thereof. The use of Teflon in a specific or particular form is illustrative only of the invention and is not to be interpreted in a limiting sense.

Bonded film 30, in this preferred embodiment of the invention, is comprised of a mixture of finely pulverized molybdenum disulphide and graphite dispersed in a cured phenolic resin, the pulverized lubricant being mixed in a substantially 9 : 1 ratio by weight with 9 parts of molybdenum disulphide to 1 part of graphite. While the constituents utilized in this preferred embodiment have been found to provide a satisfactory lubricating film, it will be appreciated of course that these constituents are merely illustrative of the invention and are not to be construed in a limiting sense. The selection of the particular constituents comprising the bonded film is strictly a matter of choice and may include any other suitable dry-tape comminuted lubricant such as boron nitride, tungsten disulphide or the like in combination with other suitable thermosetting bonding agents such as formaldehyde resins, silicone resins and vinyl resins. Suffice it to say, however, that the thermosetting agent selected should be capable of forming a tight bond that does not crack or "flake-off" in use and should be resistant to the deleterious effects of heat and pressure and to the action of hydrocarbons such as greases, oils and the like.

The mixture of comminuted molybdenum disulphide and graphite utilized as the lubricant in the preferred embodiment of the invention is a 5 micron grade although the size of the graphite particles is not critical. It has been found, however, that a solid comminuted lubricant having a particle size not greater than 7 microns provides a better lubricating action than a lubricant of larger particle size. The smaller size lubricant particles have a tendency to become more evenly dispersed in the thermosetting bonding agent and thus provide a more effective distribution of the lubricant.

It will also be appreciated that the lubricant of the bonded film 30 may be comprised of single comminuted lubricant such as molybdenum disulphide only instead of a mixture of two lubricants or furthermore may be comprised of mixture of more than two lubricants. If it is desired to use more than one comminuted lubricant in the bonded film 30, the lubricants selected can be mixed in equal or dissimilar proportions and the particle size of the lubricants may also be varied. The selection of a single comminuted lubricant or a predetermined blend of two or more will, of course, be a matter of choice which will for the most part depend on the environmental application of the lubricated bearing. For example, if it is desired to operate an anti-friction bearing at an extremely high temperature, it has been found that a comminuted lubricant comprised wholly or principally of molybdenum disulphide or boron nitride will provide a much more satisfactory lubricant than graphite.

The film thicknesses of bonded lubricant films 28 and 30 are especially important from the standpoint of satisfactory bearing operation, and in the preferred embodiment of the invention (as best seen in Fig. 2), films 28 and 30 on the components of bearing 8 each have a thickness of approximately 0.0003″. A film thickness of approximately 0.0003″ is preferable in most instances although it should be pointed-out that the film thickness per se is not critical. It has been found, however, through extensive use and experimentation, that a bonded film thickness of at least 0.0002″ and not more than 0.0005″ will provide the most satisfactory lubrication for anti-friction bearings. Past performance tests on anti-friction bearings, especially high speed and high temperature anti-friction bearings, have shown that bonded lubricant films having a thickness of less than 0.0002″ or greater than 0.0005″ will readily fail in use after a short time of bearing operation and will thus fail to provide the necessary lubrication. The selection of a bonded film of the proper or desired thickness will again be a matter of choice which will depend on the particular bearing being lubricated and the conditions under which it is desired to operate the bearing. The tolerances between the bearing components, the bearing speed and temperature, the temperature of the ambient atmosphere or cooling medium and the loading of the bearing are all factors which must be considered in making a selection of the proper thickness for the bonded film lubricant.

Although it is preferable that the bonded films 28 and 30 on the bearing components should be substantially identical in thickness and should be maintained within the 0.0002″–0.0005″ range, it will be apparent to those skilled in the art that the thickness of the bonded film may also be varied within the preferable range of 0.0002″–0.0005″ from one bearing component to another without affecting the optimum lubricating action or performance of the bonded film. For example, the bonded film on the balls of the bearing may have a thickness of 0.0002″, on the race means may have a thickness of 0.0003″ and on the cage means may have a thickness of 0.0005″. On the other hand, it has also been found that the thickness of the bonded film on the cage means of a bearing may exceed and even greatly exceed the preferred maximum thickness of 0.0005″ without seriously impairing the lubricating action of the bonded film. Bonded film thicknesses of up to 0.0012″ have been found in some instances to provide satisfactory lubrication on a bearing cage means. This increase in film thickness on the cage means of a bearing over and above the thickness of the film on the other components of the bearing is permissible in view of the fact the tolerances between the cage means and the balls is not as close as the tolerances between the other components of the bearing.

It will also be noted in Fig. 2 that the bonded films 28 and 30 are substantially uniform in overall thickness on the surface or surfaces of each of the bearing components. This substantial uniformity in thickness is especially important from the stand-point of preventing rupture or failure of the bonded films, particularly when the bearing is operated at high speeds and high temperatures. Due to the critical tolerances between the surfaces of the components of an anti-friction bearing, a bonded film which is not substantially uniform in thickness will readily produce undesirable frictional forces and heat which will quickly result in a failure of the bonded film.

Anti-friction bearings lubricated in accordance with the preferred embodiment of this invention and operated at shaft speeds of 10,000 r.p.m. and faster with light radial and thrust loads applied to the bearings have been found to perform satisfactorily for many hours without a failure or breakdown of the bonded film lubricant. On the other hand, it has also been found that when the balls or rolling elements of an anti-friction bearing in addition to the other components thereof are lubricated with a bonded film lubricant, the bearing will operate for much longer periods of time without failure of the bonded film if the shaft speed is kept below 10,000 r.p.m. and if the loading on the bearing is maintained at a relatively low value.

Figs. 3 and 4 show another embodiment of the invention wherein all of the components of an anti-friction bearing 32 except the balls 22 thereof are coated with bonded film lubricants 28 and 30. Bearing 32 is otherwise identical in all structural details to bearing 8 shown in Figs. 1 and 2, and the thicknesses of the bonded film 28 and 30 within the limits hereinbefore discussed in connection with the preferred embodiment of the invention as well as the constituent mixture of the bonded film 28 is strictly a matter of choice which is again dependent on the environmental application of bearing 32 and the conditions under which it is expected to operate. Performance tests have indicated that an anti-friction bearing lubricated in accordance with this embodiment of the invention will operate satisfactorily for many hours at shaft speeds of 10,000 r.p.m. with relatively heavy radial and axial loads applied to the bearing without failure of the bonded films 28 and 30. In general, it has been found that an anti-friction bearing lubricated as shown in Figs. 3 and 4 will operate satisfactorily for much longer periods of time and at higher speeds and under much heavier loading than an anti-friction bearing lubricated in accordance with the preferred embodiment of the invention.

Figs. 5 and 6 show another embodiment of the invention wherein an anti-friction bearing 34 is provided with a Teflon bonded film lubricant 28 on the cage means 24 thereof and is provided with a dry-type lubricant bonded film 30 on the raceways 12 and 18 only thereof. Bearing 34 is otherwise identical in all structural details to bearings 32 of Figs. 3 and 4. Bearing 34 has generally been found to have performance characteristics substantially identical to the performance characterstics of bearing 32; however, its chief advantage over bearing 32 has been found to reside in certain environmental applications of the bearing wherein the widths of the bearing race means 10 and 16 and the outside diameter of the outer race means 16 are critical. By eliminating the bonded film lubricant on the two race means other than coating the surface of the raceways 12 and 18 thereof, the maximum outside dimensions of the two race means can be somewhat reduced.

Anti-friction bearings lubricated in accordance with the present invention have been found to perform satisfactorily and to possess a relatively low and substantially uniform operating torque or frictional drag over a wide range of operating temperatures. Tests have shown that an anti-friction bearing lubricated in accordance with the preferred embodiment of the invention will perform at a substantially constant operating torque at temperatures ranging from —94° F. to 350° F. These tests also showed that there was very little difference between the starting and running torque of the bearing so lubricated. Tests conducted on anti-friction bearings lubricated as shown in Figs. 3 and 4 and Figs. 5 and 6 also revealed the existence of a relatively low starting torque, a substantially constant operating torque over a wide temperature range and a small differential between the starting and running torques of the bearings so lubricated, the temperature varying between —94° F. to 350° F.

*Method*

The preferred method of lubricating anti-friction bearings and more particularly high speed and high temperature ball-type bearings the components of which are made of steel is comprised of the following steps, the method being operable to produce a lubricated bearing substantially identical to the lubricated anti-friction bearing shown in Figs. 1 and 2. The components of an unassembled ball bearing, the inner and outer race means, the balls or rolling elements and the retainer or cage means, are first cleaned to effect the removal of any contaminating foreign matter from the external surfaces thereof, particularly the removal of oils and greases. The components are cleaned in this preferred embodiment by vapor degreasing with a trichloroethylene vapor, although it will be apparent that the components could be cleaned with any other suitable type of cleaning agent or could be cleaned in any other suitable manner. On the other hand, the cleaning step can be completely eliminated if the components are free of contaminating foreign matter. The cleaning step is merely an optional step to be used when necessary.

After cleaning, the cage means of the bearing is preheated to a predetermied temperature to drive-off any occluded gases and other adverse material therein. In this preferred embodiment of the invention, the cage means is preheated to 750° F. by baking although the preheat temperature per se is not critical and could be selectively varied above or below this preferred value to a considerable extent. The particular preheat temperature selected will for the most part depend on the particular material utilized in the construction of the cage means and any temperature which will result in the elimination of the occluded gasses and other adverse material will obviously be satisfactory. It will also be apparent that the cage means could be preheated by any other suitable means or process than baking.

After being cooled to room temperature or thereabout, preferably 70°, the inner surfaces of the pockets in the cage means are finished or smoothed to eliminate any burrs, projections, surface irregularities or the like therefrom which would possibly interfere with the proper movement or rotation of the balls in the pocket surfaces are preferably finished with a No. 400 emery cloth although it will be appreciated that any other suitable means could just as easily be utilized. After the pockets have been finished to the desired smoothness, the cage means is washed to remove any grit or abrasive particles therefrom and then allowed to dry. The cage means is preferably washed in a petroleum ether although any suitable solvent capable of removing the grit and abrasive particles adhering thereto could be used in place thereof.

After the washing and drying operation, a coating or film of tetrafluoroethylene (Teflon) is applied to the cage means. In this preferred embodiment of the method, the Teflon is comprised of a liquid paint-like enamel, well known commercially as DuPont 851–204 and basically consisting of resinous tetrafluoroethylene dispersed in a water medium or a water emulsion of Teflon. This Teflon in liquid form is preferably applied to the cage means by spraying although it will be apparent that any other suitable means or process such as brushing or dipping could be utilized. This invention also contemplates the use of Teflon in a form other than a water emulsion of Teflon or the like as a coating or film for the cage means of a bearing. Teflon may be applied to the cage means in the form of a paste, a solid, a colloidal suspension, etc., to name just a few of the many and varied forms which the Teflon may take. Teflon in any suitable form may be applied by any suitable method, but the form and method selected should insure the application of a substantially uniform film having a predetermined thickness.

As was hereinbefore mentioned in connection with the preferred embodiment of the lubricated anti-friction bearing (Figs. 1 and 2), the Teflon film on the cage means should not only be substantially uniform in thickness but should also have a preferable thickness of not less than 0.0002" or greater than 0.0005". Accordingly, the thickness of the Teflon film applied in the preferred embodiment of the method is 0.0003". It is also noteworthy to mention that it is preferable to rotate the cage means while the Teflon coating is being sprayed thereon. The rotation of the cage means will facilitate the application of the coating thereto and will more or less insure that the coating will be substantially uniform in thickness on all of the surfaces of the cage means.

After the coating operation, the Teflon-covered cage means is slowly dried in air for a predetermined time or a time sufficient to permit the Teflon coating to acquire a smooth and uninterrupted external surface. In this preferred embodiment of the invention, the coated cage means is air dried at 70° F. for a period of 16 hours although neither the temperature nor the time are critical. The selection of a particular temperature and time is obviously a matter of choice and will be determined for the most part by the form of Teflon utilized in the coating.

After air-drying, the coated cage means is preheated or pre-cured by any suitable means or process to effect a partial bond between the Teflon film and the cage means. In this preferred embodiment, the cage means is preheated by baking at a temperature of 350° for 5 minutes although neither the temperature nor the time is critical and thus may be selectively varied. The selection of a particular temperature and time will again be a matter of choice depending mainly on the form of Teflon utilized in the coating. Furthermore, when using some forms of Teflon, the preheating or pre-curing step can be completely eliminated and is therefore optional. In fact, in the preferred embodiment of the method, the pre-curing step can be eliminated without seriously affecting the tenacity of the bond between the Teflon coating and the cage means.

After pre-curing, when utilized or when necessary, the coated cage means is heated by a suitable means or process to cure or effected the polymerization of the Teflon coating and thereby tightly bond or affix the Teflon film to the cage means. The coated cage means is preferably baked at a curing temperature of 750° for a period of 7 minutes. The temperature and time selected for curing obviously should not result in damage to or in the decomposition of the Teflon film but, otherwise, are not critical. Any combination of temperature and time that produces a quick thermosetting of the Teflon and a consequent rigid bonding of the Teflon to the surfaces of the cage means will be satisfactory.

Immediately after the curing operation, the cage means with the bonded Teflon film thereon is quenched in a suitable medium to harden the Teflon and further increase the tenacity of the bond between the Teflon film and the cage means. Water at 70° F. or at substantially room temperature is utilized as the quenching medium in the preferred embodiment of the method although any other well known or suitable quenching medium at any suitable temperature could be used in place thereof. Any quenching medium at any particular temperature which is capable of effecting a rapid "setting" or hardening of the Teflon film will be satisfactory.

The remainder of the unassembled components of the bearing, the balls and the inner and outer race means, are coated with a lubricating composition or film comprised of a solid comminuted lubricant suspended in a thermosetting bonding agent, which in this preferred embodiment of the invention is comprised of a mixture of finely pulverized or comminuted molybdenum disulphide and graphite suspended in a phenolic resin. The mixture of pulverized lubricants and phenolic resin is thinned by the addition of an organic solvent mixture thereto, which in this preferred embodiment is comprised of a mixture of 50% methylethylketone, 25% xylene and 25% butanol, and the thinned mixture is then applied to the bearing components by spraying. The mixture may be thinned to any desired consistency suitable for spraying, and it will be appreciated that any suitable thinner other than the mixture used in connection with the preferred embodiment may be utilized, thinners such as xylene, xylene-toluene, toluene, etc.

The proportionate mixture of the constituents of the coating composition applied to the balls and race means in the preferred embodiment of the invention includes the following constituents in percentages by weight: molybdenum disulphide 18, graphite 2, phenolic resin 12, thinner 68. The proportionate mixture of constituents is not critical, however, and will be determined mainly by such factors as the environmental application of the bearing and the tolerances between the components thereof. Furthermore, it will be readily understood by those skilled in the art that the percentags of the constituents utilized in the preferred embodiment of the method is merely illustrative of the invention and is not to be interpreted in a limiting sense. Mixing of the constituents may be effected by any suitable means such as milling or agitating. The size of the graphite particles, likewise, is not critical although it has been found that solid lubricants having a particle size not greater than 7 microns provide the best lubrication. Accordingly, the comminuted graphite utilized in the preferred embodiment is of a 3 micron particle size.

A thermosetting bonding agent other than a phenolic resin may also be used. Organic bonding agents such as silicone resins, vinyl resins, and epoxy resins have been found to be satisfactory. As discussed hereinbefore, however, the bonding agent selected must be capable of holding a solid comminuted lubricant in suspension and must also be resistant to heat and pressure in addition to the attacks of various hydrocarbons.

Instead of a mixture of molybdenum disulphide and graphite, the lubricant in the coating composition may be comprised of only a single comminuted lubricant or a mixture of more than two comminuted lubricants. Other suitable lubricants in comminuted form such as boron nitride and tungsten disulphide may be utilized. The selection of a particular lubricant or lubricants is, again, as discussed hereinbefore in connection with the preferred embodiment of the lubricated bearing (Figs. 1 and 2), a matter of choice depending mainly on the environmental application of the bearing.

As also mentioned hereinbefore in connection with the preferred embodiment of the lubricated bearing, the coating composition on the balls and race means must be substantially uniform in thickness and the thickness preferably should not be less than 0.0002" or greater than 0.0005". Therefore, in spraying the balls and race means of the bearing, care must be exercised to insure the application of a substantially uniform film, the film having in this preferred embodiment of the method a thickness of approximately 0.0003". It is also noteworthy to mention that it is preferable to rotate the balls and race means while the lubricant coating is being sprayed thereon. The rotation of these components will facilitate the application of the coating to the components and will more or less insure that the coating will be substantially uniform in thickness on all of the surfaces of the components.

Although spraying is the preferred method by which the coating film is applied to the balls and race means, this invention also contemplates the use of any other suitable method of coating the components such as by dipping or brushing. Any suitable method may be utilized, but the method selected should insure the application of a substantially uniform film having a predetermined thickness.

After coating, the unassembled balls and race means are air dried or dried at room temperature for a predetermined period. In the preferred embodiment of the invention, the coated balls and race means are air dried for one hour at an ambient temperature of 70° F. It will be understood of course that this preferred time and temperature are not critical and may be varied to a considerable extent far above or far below these preferred values. The purpose of the air drying step is to insure the formation of a smooth external surface on the coating or film covering the bearing components through the slow evaporation of the solvent in the coating. On the other hand, when the coating includes a solvent having a high vapor pressure, the air drying step in the method may be omitted inasmuch as most of the solvent will have already evaporated upon completion of the spraying operation.

After air drying, the unassembled balls and race means of the bearing are heated to cure or harden the thermosetting bonding agent and thereby tightly bond or affix the comminuted lubricant thereto. The coated components in the preferred embodiment are heated by baking, the components being baked for a period of one hour at a temperature of 300° F. The temperature selected for heating obviously should not exceed the decomposition temperature of the coating but otherwise is not critical. Any heating temperature which produces a quick thermosetting of the bonding agent and a consequent rigid bonding of the comminuted lubricant to the surfaces of the bearing components will be satisfactory.

After the quenching of the coated cage means and the heating of the coated balls and race means, all of the unassembled components of the bearing are assembled into an operative unit to provide an anti-friction bearing substantially identical to the bearing shown in Figs. 1 and 2, an anti-friction bearing having bonded lubricant films on all of the surfaces of the components thereof and, more particularly, on the friction surfaces of the components.

Another embodiment of this invention contemplates a method wherein all of the components of an anti-friction bearing except the rolling elements or balls thereof are coated with bonded lubricant films. In other words, this method is identical with the preferred method of lubricating an anti-friction bearing with the exception that the balls are not included in the cleaning, coating, air drying and heating steps of the process. An anti-friction bearing lubricated in accordance with this embodiment of the invention would be substantially identical in structure to the anti-friction bearing shown in Figs. 3 and 4, the cage means of the bearing being covered with a lubricating film of Teflon.

Another embodiment of the present invention envisions the idea of lubricating an anti-friction bearing by covering only the cage means and the raceways in the inner and outer race means with bonded lubricant films, the cage means being covered with a Teflon film and the raceways being covered with a dry-type lubricant film. In this embodiment of the invention, the inner and outer races of the bearing are masked after being cleaned to cover all of the external surfaces thereof other than the raceways therein. After the masking step, the raceways only are coated with the lubricating composition including the dry-type lubricant. Aside from the masking step, this embodiment of the method is otherwise identical to the last embodiment and would result in the production of a lubricated bearing substantially identical in structure to the bearing shown in Figs. 5 and 6.

Although the present invention has been specifically shown and herein described in connection with a ball-type anti-friction bearing made of steel, it will readily be appreciated that the invention could be applied with equal facility to the lubrication of a roller-type anti-friction bearing or any other type of anti-friction bearing made of iron, stainless steel or any other material suitable for use in the construction of anti-friction bearings.

Obviously many modifications and variations of the present invention are possible in the light of the above teachings. It is therefore to be understood that within the scope of the appended claims the invention may be practiced otherwise than as specifically described.

What is claimed is.

1. A method of lubricating an anti-friction bearing the components of which are unassembled and include inner race means having a raceway therein, outer race means having a raceway therein, rolling elements associated with said raceways and retainer means having pockets therein for receiving said rolling elements and thereby separating said rolling elements, comprising the steps of coating said rolling elements and said inner and outer race means with a solid comminuted lubricant suspended in a thermosetting resin, heating said coated components at a predetermined temperature for a predetermined time to harden said thermosetting resin and thereby tightly bond said comminuted lubricant to said coated components, preheating said retainer means to a predetermined temperature, cooling said retainer means to a predetermined temperature, coating said retainer means with a thermosetting water emulsion of tetrafluoroethylene, drying said coated retainer means in air for a predetermined time heating said air dried retainer means at a predetermined temperature for a predetermined time to polymerize said tetrafluoroethylene and thereby tightly bond said tetrafluoroethylene to said retainer means, quenching said coated retainer means to harden said tetrafluorcethylene, and assembling the coated components of said bearing into an operative unit to thereby provide an anti-friction bearing having a lubricating film bonded on the friction surfaces of the components thereof.

2. A method of lubricating an anti-friction bearing as claimed in claim 1 further including the step of preheating said coated retainer means after the air drying thereof, said coated retainer means being preheated to a predetermined temperature.

3. A method of lubricating an anti-friction bearing as claimed in claim 1 wherein said inner and outer race means, said rolling elements and said retainer means are coated by spraying.

4. A method of lubricating an anti-friction bearing as claimed in claim 1 wherein said coated components of said bearing are preheated and heated by baking.

5. A method of lubricating an anti-friction bearing as claimed in claim 1 wherein said coated components of said bearing are coated by brushing.

6. A method of lubricating an anti-friction bearing as claimed in claim 1 wherein said components of said bearing are coated by dipping.

7. A method of lubricating an anti-friction bearing as claimed in claim 1 wherein said solid comminuted lubricant is comprised of a mixture of molybdenum disulphide and graphite.

8. A method of lubricating an anti-friction bearing as claimed in claim 1 wherein said comminuted lubricant is comprised of molybdenum disulphide.

9. A method of lubricating an anti-friction bearing as claimed in claim 1 wherein said comminuted lubricant is comprised of graphite.

10. A method of lubricating an anti-friction bearing as claimed in claim 1 further including the step of cleaning said inner and outer race means and said rolling elements prior to the coating thereof to remove the contaminating foreign matter therefrom.

11. A method of lubricating an anti-friction bearing as claimed in claim 1 further including the step of air drying said inner and outer race means and said rolling elements for a predetermined time after the coating thereof.

12. A method of lubricating an anti-friction bearing as claimed in claim 1 further including the step of finishing the inner periphery of said pockets in said retainer means after the cooling thereof to provide smooth surfaces thereon.

13. A method of lubricating an anti-friction bearing as claimed in claim 12 further including the step of cleaning said retainer means after the finishing of the pockets thereof to remove the unattached material therefrom resulting from said finishing operation.

14. A method of lubricating an anti-friction bearing the components of which are unassembled and include inner race means having a raceway therein, outer race means having a raceway therein, rolling elements carried in said raceways and retainer means having pockets therein for receiving said rolling elements and separating said rolling elements in said raceways, comprising the steps of coating said inner and outer race means with a solid comminuted lubricant suspended in a thermosetting resin, heating said coated inner and outer race means at a predetermined temperature for a predetermined time to harden said thermosetting resin and thereby tightly bond said comminuted lubricant to said inner and outer race means, preheating said retainer means to a predetermined temperature, cooling said retainer means to a predetermined temperature, coating said retainer means with a thermosetting water emulsion of tetrafluoroethylene, drying said coated retainer means in air for a predetermined time, heating said air dried retainer means at a predetermined temperature for a predetermined time to polymerize said tetrafluoroethylene and thereby tightly bond said tetrafluoroethylene to said retainer means, quenching said coated retainer means to harden said tetrafluoroethylene, and assembling the components of said bearing into an operative unit to thereby provide an anti-friction bearing having a lubricating film bonded on the friction surfaces of the components thereof.

15. A method of lubricating an anti-friction bearing the components of which are unassembled and include inner race means having a raceway therein, outer race means having a raceway therein, rolling elements carried in said raceways and retainer means having pockets therein for receiving said rolling elements and thereby separating said rolling elements, comprising the steps of masking said inner and outer race means to cover the external surfaces thereon other than said raceways, coating said raceways with a solid comminuted lubricant suspended in a thermosetting resin, heating said inner and outer race means at a predetermined temperature for a predetermined time to harden said thermosetting resin and thereby tightly bond said comminuted lubricant to said raceways, preheating said retainer means to a predetermined temperature, cooling said retainer means to a predetermined temperature, coating said retainer means with a thermosetting water emulsion of tetrafluoroethylene, drying said coated retainer means in air for a predetermined time, heating said air dried retainer means at a predetermined temperature for a predetermined time to polymerize said tetrafluoroethylene and thereby tightly bond said tetrafluoroethylene to said retainer means, quenching said coated retainer means to harden said tetrafluoroethylene, and assembling the components of said bearing into an operative unit to thereby provide an anti-friction bearing having a lubricant film bonded on the friction surfaces of the components thereof.

References Cited in the file of this patent

UNITED STATES PATENTS

| | | |
|---|---|---|
| 1,639,351 | Robson | Aug. 16, 1927 |
| 1,947,004 | Goddard et al. | Feb. 13, 1934 |
| 2,504,094 | Turner et al. | Apr. 11, 1950 |
| 2,516,567 | Hamm | July 25, 1950 |
| 2,685,545 | Sindeband | Aug. 3, 1954 |
| 2,697,645 | Mitchell | Dec. 21, 1954 |
| 2,704,234 | Love | Mar. 15, 1955 |
| 2,715,617 | White | Aug. 16, 1955 |
| 2,720,119 | Sherman | Oct. 11, 1955 |

FOREIGN PATENTS

| | | |
|---|---|---|
| 754,115 | Great Britain | Aug. 1, 1956 |
| 769,390 | Great Britain | Mar. 6, 1957 |

OTHER REFERENCES

"Nylon," pages 119–123, Product Engineering, February 1952.